United States Patent
Kolodner et al.

(10) Patent No.: US 7,043,369 B2
(45) Date of Patent: May 9, 2006

(54) RADIANCE LIBRARY FORECASTING FOR TIME-CRITICAL HYPERSPECTRAL TARGET DETECTION SYSTEMS

(75) Inventors: Marc A. Kolodner, Gaithersburg, MD (US); Patricia K. Murphy, Takoma Park, MD (US); Edward E. Hume, Eldersburg, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/819,621

(22) Filed: Apr. 7, 2004

(65) Prior Publication Data

US 2004/0210391 A1    Oct. 21, 2004

Related U.S. Application Data

(60) Provisional application No. 60/462,944, filed on Apr. 15, 2003.

(51) Int. Cl.
*G06Q 99/00* (2006.01)
(52) U.S. Cl. .............................................. 702/3; 702/5
(58) Field of Classification Search .................... 702/3, 702/4, 5, 2
See application file for complete search history.

(56) References Cited

U.S. PATENT DOCUMENTS

| | | | |
|---|---|---|---|
| 5,255,190 A * | 10/1993 | Sznaider | 702/3 |
| 5,324,113 A | 6/1994 | Ingram et al. | |
| 5,462,357 A | 10/1995 | Ingram et al. | |
| 5,884,226 A | 3/1999 | Anderson | |
| 6,075,891 A | 6/2000 | Burman | |
| 6,161,075 A | 12/2000 | Cohen | |
| 6,304,664 B1 | 10/2001 | Silva et al. | |
| 6,484,099 B1 | 11/2002 | Holzer-Popp et al. | |
| 6,584,405 B1 | 6/2003 | Moncet | |
| 6,622,100 B1 | 9/2003 | Whitsitt et al. | |
| 2002/0015151 A1 | 2/2002 | Gorin | |
| 2002/0096622 A1 | 7/2002 | Adler-Golden et al. | |
| 2003/0096425 A1 | 5/2003 | Berk et al. | |

OTHER PUBLICATIONS

Kolodner et al., "Near-Real Time HSI Target ID Using AFWA Weather Forecast Data", Aug. 2001, University Partnering for Operational Support, Johns Hopkins University Applied Physics Laboratory, Laurel, Maryland, 19 pages.*

Kolodner et al., "Upos Atmospheric Profile Generator ", Johns Hopkins University Applied Physics Laboratory, Laurel, Maryland, 12 pages.*

Kolodner, Marc A., "User's Guide for the UPOS Product Atmospheric Profile Generator", Apr. 20, 2001, Johns Hopkins University Applied Physics Laboratory, Laurel, Maryland, pp. 1-10.*

* cited by examiner

Primary Examiner—Donald McElheny, Jr.
(74) Attorney, Agent, or Firm—Benjamin Y. Roca

(57) ABSTRACT

A method and structure that inputs atmospheric forecast information from the atmospheric forecast database based on current, real time atmospheric measurements. The hyperspectral detection processing unit also inputs at least one selected reflectance library from the reflectance library database, and data collection and sensor parameters from the sensor. With this information, the hyperspectral detection processing unit employs a model to produce at least one mission radiance library during the mission planning phase. Then, during the actual mission execution, the sensor is used to collect the hyperspectral data and the comparator can immediately compare the hyperspectral data to the mission radiance library to identify features and/or targets.

20 Claims, 3 Drawing Sheets

RADIANCE LIBRARY FORECASTING FOR TIME-CRITICAL HYPERSPECTRAL TARGET DETECTION SYSTEMS

CROSS REFERENCE TO RELATED APPLICATIONS

This application claims the benefit of U.S. Provisional Patent Application No. 60/462,944, filed on Apr. 15, 2003. That Provisional Patent Application is hereby incorporated by reference in its entirety.

STATEMENT OF GOVERNMENTAL INTEREST

This invention was made with government support under contract number N00024-98-D-8124 awarded by the Department of the Navy. The government has certain rights in this invention.

BACKGROUND OF THE INVENTION

1. Field of the Invention

The invention presents a method and system for performing hyperspectral detection.

2. Description of the Related Art

Timely detection of targets continues to be a top priority for hyerspectral remote sensing capability. A hyperspectral sensor measures the radiance emanating from each pixel in a scene at multiple wavelengths, creating a datacube of the scene. The hyperspectral community has been trying over the past several years to operationalize this technology. One of the difficulties has been characterizing the intervening atmosphere between the target and the sensor.

Traditionally, atmospheric compensation techniques are applied, either empirically or through modeling, to transform the at-sensor radiance datacube to a surface reflectance datacube. Once in reflectance space, the spectra of each pixel can be compared to spectral reflectance libraries. This conversion has worked well for applications such as land use identification and mineralogy classification. This approach, though, is not optimal for time-critical detection of targets. First, it is computationally expensive to perform such a pixel-by-pixel transformation. Second, the resulting reflectance cube contains artifacts near absorption bands that are difficult to account for in near real-time. Finally, this approach does not lend itself well to scenes with significant illumination variability, such as the detection of shadowed targets.

One proposed atmospheric compensation technique is called the 'invariant subspace method' (Healey and Slater, IEEE Trans. Geosci. Remote Sensing, vol. 37, pp. 2706–2717, Nov. 1999), incorporated herein by reference. In this approach, target reflectance spectra are projected to the at-sensor radiance domain using MODTRAN (a radiative transfer code). This method uses climatological parameters to produce literally thousands of signatures to simulate all possible atmospheric and illumination conditions and is a computational burden on the mission planner and on the target detection processor and thus not optimal for the tactical environment.

SUMMARY OF THE INVENTION

The invention presents a method and system for performing hyperspectral detection. With the invention, a hyperspectral detection processing unit is connected to at least one atmospheric forecast database and at least one ground based reflectance library database that is generated based on surface reflectance measurements. A hyperspectral sensor and comparator are connected to the hyperspectral detection processing unit.

The hyperspectral detection processing unit inputs atmospheric forecast information from the atmospheric forecast database based on current, real time atmospheric measurements. The hyperspectral detection processing unit also inputs at least one selected surface reflectance library from the reflectance library database, and data collection and sensor parameters from the sensor. With this information, the hyperspectral detection processing unit processes a model to produce at least one mission radiance library during the mission planning phase. Then, during the actual mission execution, the sensor is used to collect the hyperspectral data and the comparator can immediately compare the hyperspectral data to the radiance library to identify features and/or targets.

This atmospheric forecast information comprises a prediction of atmospheric conditions that will occur in the area where the collecting of the hyperspectral data is to be performed, during the time period when the collecting of the hyperspectral data is to be performed. The reflectance library comprises historical surface reflectance measurements of the feature or target to be searched. The mission radiance libraries produced by the model comprise a prediction of what the sensor is expected to observe during the process of collecting the hyperspectral data if the feature or target is present in the scene, given the current weather conditions. Thus, the mission radiance library is specific to the mission being executed during the process of collecting the hyperspectral data. The process of collecting hyperspectral data comprises, for example, collecting aerial images of a planet surface.

As shown in greater detail below, the invention performs atmospheric compensation during the mission-planning phase. More specifically, the invention selects spectral reflectance libraries from the target signatures database and projects them to the at-sensor and collection-specific radiance domain using the weather forecast data. This obviates the need to compensate the entire datacube and allows for platform-based target detection immediately following the acquisition of the datacube. In other words, with the invention, all of the atmospheric compensation takes place in the mission-planning phase of an operation which allows features and targets to be easily identified through a quick comparison operation while the image data is being captured by the sensor. Therefore, the invention is vastly superior to conventional systems because it provides compensation and features/target identification in real time as the sensor captures data and produces a very low computational burden at the time of data acquisition (image sensing). Therefore, the invention is substantially more useful, easier to produce, and less-expensive then conventional systems.

These, and other, aspects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
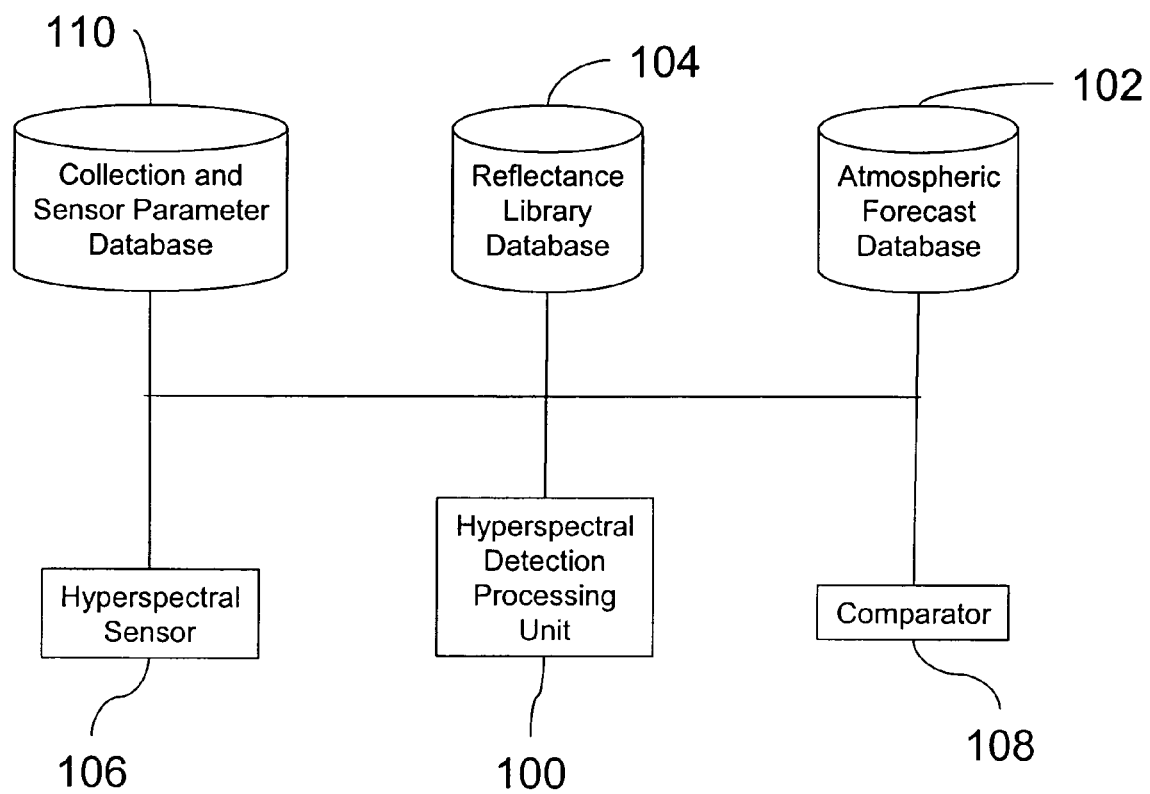
FIG. 1 is a schematic diagram of a systems embodiment of the invention.

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

As discussed above, conventional atmospheric compensation techniques are applied, either empirically or through modeling, to transform the at-sensor radiance datacube to a surface reflectance datacube. Once in reflectance space, the spectra of each pixel can be compared to spectral reflectance libraries. The invention is different from conventional techniques because, among other reasons, the invention performs atmospheric compensation during the mission-planning phase. More specifically, the invention selects spectral reflectance libraries from a target signatures database and projects them to the at-sensor and collection-specific radiance domain using the weather forecast data. This obviates the need to compensate the entire datacube and allows for platform-based target detection immediately following the acquisition of the datacube. In other words, with the invention, all of the atmospheric compensation takes place in the mission-planning phase of an operation which allows features and targets to be easily identified through a quick comparison operation while the image data is being captured by the sensor. Therefore, the invention is vastly superior to conventional systems because it provides compensation and the capability for features/target identification in real time as the sensor captures data and produces a very low computational burden at the time of data acquisition (image sensing). Therefore, the invention is substantially more useful, easier to produce, and less-expensive then conventional systems.

As shown in FIG. 1, one embodiment of the invention includes a hyperspectral detection processing unit 100 that is connected (permanently or temporarily) to at least one atmospheric forecast database 102, and to at least one ground based reflectance library database 104. The ground based reflectance libraries found within the reflectance library database 104 are based on historical ground target reflectance measurements. A hyperspectral sensor 106 (or equivalent collection and sensor parameters database) is connected (permanently or temporarily) to the hyperspectral detection processing unit 100 to provide collection and sensor parameters. Alternatively, a separate collection and sensor parameters database 110 can supply this information. The invention also includes a comparator 108 that can be external to the hyperspectral detection processing unit 100, as shown in FIG. 1, or part of the hyperspectral detection processing unit 100 and/or part of the sensor system 106.

Figure 2:
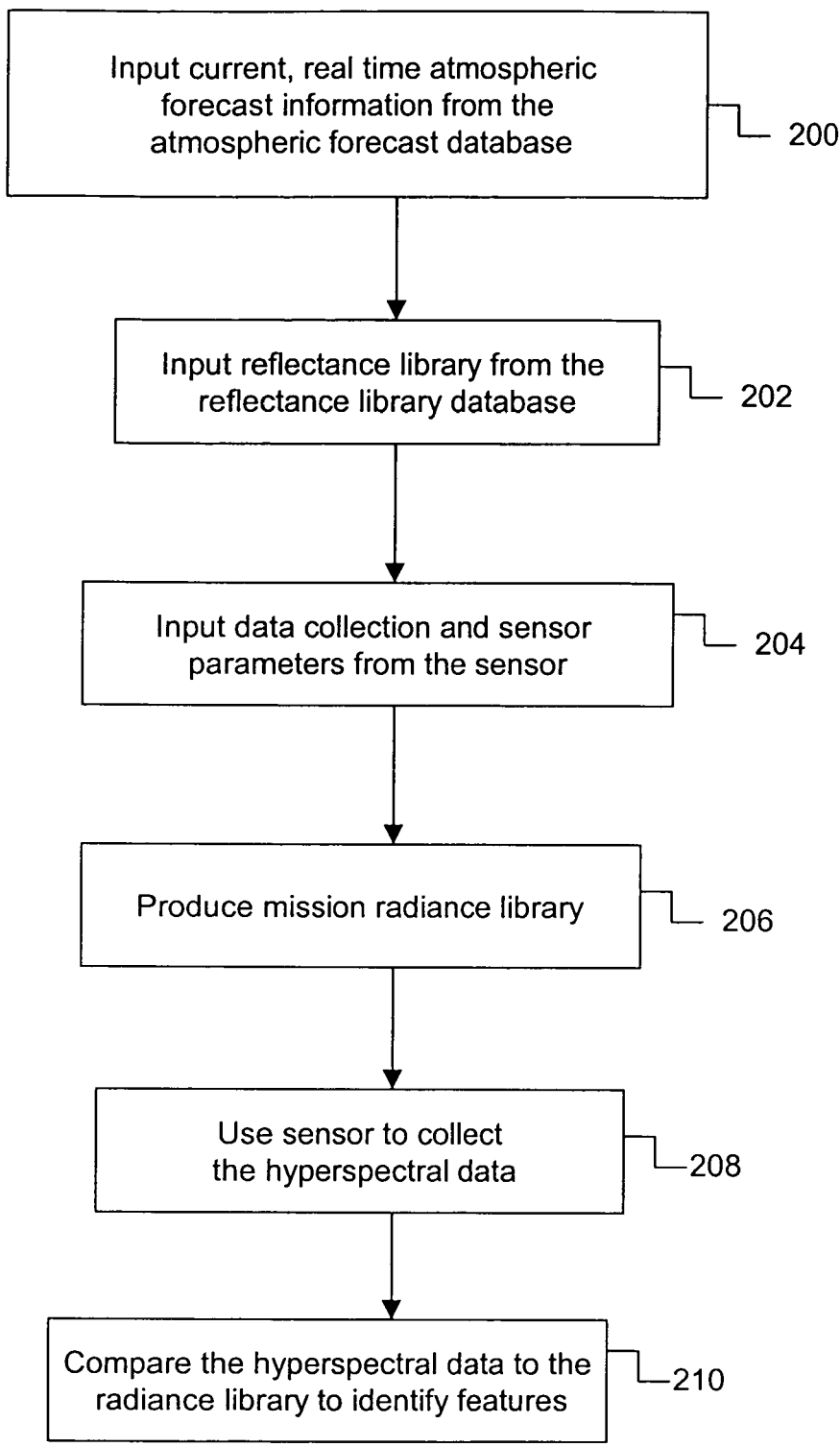
FIG. 2 is a flow diagram illustrating a preferred method of the invention.

As shown in flowchart form in FIG. 2, the hyperspectral detection processing unit inputs current, real time atmospheric forecast information 200 from the atmospheric forecast database based on current, real time atmospheric measurements that are processed through one or more weather forecasting models to produce the forecast information. The hyperspectral detection processing unit also inputs at least one selected reflectance library 202 from the reflectance library database, and data collection and sensor parameters 204 from the sensor (or sensor database 110). With this information, the hyperspectral detection processing unit employs a model to produce at least one mission radiance library 206 during the mission planning phase.

Once the invention creates the mission radiance library, the hyperspectral detection processing unit 100 can be disconnected from the databases 102, 104 and connected to the sensor 106 so as to become mobile and provide the mission radiance library to the comparator while the mission is being executed (flown). Alternatively, if the sensor includes or is in constant communication with the comparator 108, the hyperspectral detection processing unit 100 only needs to forward the mission radiance library to the comparator, thereby allowing the hyperspectral detection processing unit 100 to remain permanently connected to the various databases. Then, during the actual mission execution, the sensor is used to collect the hyperspectral data 208 and the comparator can immediately compare the hyperspectral data to the radiance library to identify features and/or targets 210 in real time (or near real-time—seconds or minutes after data acquisition).

Figure 3:
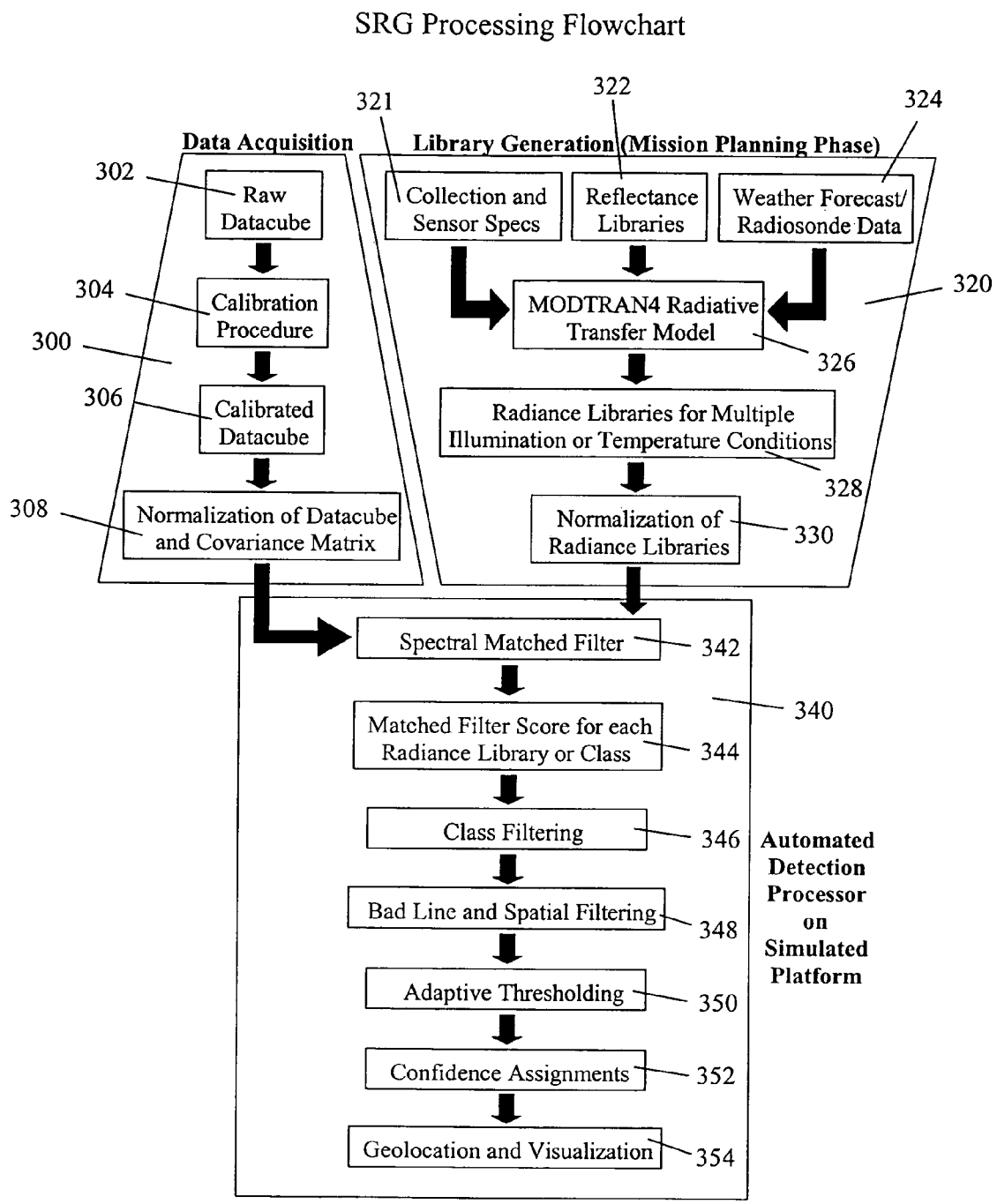
FIG. 3 is a flow diagram illustrating a preferred method of the invention.

FIG. 3 is a more detailed flowchart of various specific operations the invention performs. More specifically, as shown in FIG. 3, the invention employs a three-phase approach for automated detection of targets. The Data Acquisition 300 and Library Generation (or Mission Planning) 320 phases provide the necessary input for the Automated Detection Processor phase 340.

More specifically, in the data acquisition phase 300, processing begins with the raw data cube information 302 from the sensor 106. Item 304 represents a calibration procedure, which results in a calibrated data cube 306. The data cube and covariance matrix are normalized using standard procedures in item 308.

The library generation phase 320 makes reference to the collection and sensor specifications 321 (which corresponds to the collection and sensor parameters database 110 in FIG. 1). This phase also makes reference to the reflectance libraries 322 (which corresponds to the reflectance library database 104 in FIG. 1) as well as to the weather forecast data 324 (which corresponds to the atmospheric forecast database 102 in FIG. 1). The invention uses a radiative transfer model 326 (e.g., MODTRAN4) to produce radiance libraries for multiple illumination or temperature conditions 328, and normalizes the radiance libraries in item 330.

The Automated Detection phase 340 provides a sequence of steps to first match the library spectra to the hyperspectral datacube and then to extract the optimal information from the resulting detection scores. The process begins with the application of the well known spectral matched filter 342. The matched filter uses the datacube statistics to both suppress the background and enhance the target signal to noise. The resulting matched filter scores 344 then pass through three automated filters. Class filtering 346 removes classes that are of little use to the detection processor due to their high false alarm rates. Bad line and spatial filtering 348 clean up the remaining classes by removing bad lines, and unwanted spatial features in the image scores. Next, the adaptive thresholding step 350 implements a powerful automated technique to assign the optimal threshold for each class. This step applies a 'blob finding' approach, that has been used in the medical imaging field, in a unique way for the tagging of resolved targets. This is followed by the novel confidence assignments step 352 that bases detection confidence on the number of hits (or tags) each pixel in the image receives from different but spectrally similar classes (or radiance libraries). The final step, geolocation and visualization 354, overlays the color coded tags onto a true color image of the scene.

The invention focuses on airborne, UAV (unmanned aerial vehicles), and satellite-based sensors operating in the visible to the shortwave infrared (0.4–2.5 microns). These bands are optimal for detecting targets with surface material properties (characterized by their reflectance) that differ spectrally from the background. The invention performs this 'radiance library forecasting' using the Air Force Weather Agency's Fifth Mesoscale Model (MM5); however, one ordinarily skilled in the art would understand that any similar modeling program could be utilized. This modeling program provides 15–45 km gridded weather profiles and parameters (such as pressure, temperature, relative humidity, winds, and visibility) over every theater area in the world. Weather nowcasts are provided 4 times at day (0, 6, 12, and 18Z) and weather forecasts are performed in 3 hour increments from the nowcasts out to 72 hours. There have been great advances in weather forecasting over the past several years due to the wealth of satellite data available, improvements in climatologically models, and the assimilation of satellite and model data. In-situ radiosonde data, by comparison, are available only twice a day at most and are rarely accessible in data denied areas.

As mentioned above, one ordinarily skilled in the art would understand that many different types of software programs could be utilized with invention and that the specific programs mentioned herein are only used as examples. As mentioned above, the invention can use, for example, the government software MODTRAN4, a radiative transfer code developed by AFRL (Air Force Research Laboratory located in Hanscom Air Force Base, MA). Similarly, the invention can use, for example, a decoder called WGRIB, developed by NOAA (National Oceanic and Atmospheric Administration located in Washington D.C.), to decode the AFWA MM5 gridded binary weather data (although any similar decoder could be utilized). The invention runs the software on the Environment for Visualizing Images (ENVI) development platform, available from Research Systems, Inc. (RSI) located in Boulder, Colo. (although one ordinarily skilled in the art would understand that any similar platform could be utilized).

As mentioned above, the invention uses databases of reflectance libraries. One such database of reflectance libraries comes from the Spectral Information Technology Applications Center (SITAC) located in Fairfax, Va. This organization has archived thousands of targets signatures from all major hyperspectral campaigns. The reflectance to radiance projection is performed using the radiative transfer code MODTRAN4 developed by the Air Force Research Laboratory (AFRL), although any similar reflectance to radiance projection program could be utilized with the invention. As additional input, the invention utilizes the hyperspectral sensor specifications and the scene geometry. Radiance libraries can be computed for both nadir (downward) and off-nadir (slant path) viewing sensors, though the former is more common. MODTRAN4 also provides climatological parameters, such as ozone, that are not present in the MM5 weather data. Other parameters, such as aerosols and clouds, are derived by MODTRAN4 from MM5 parameters.

The invention utilizes ENVI (The Environment for Visualizing Images) software to provide a "Spectral Radiance Generator" (SRG, see FIG. 3) that links MODTRAN4 with the SITAC Database and the MM5 Gridded Weather Data in the hyperspectral detection processing unit 100, although as would be understood by one ordinarily skilled in the art, any similar software could be utilized. The invention also provides a visualization tool to allow the user to zoom in and select the MM5 grid point of interest in a theater area. The SRG can also incorporate local radiosonde data (from the NOAA Forecast Systems Laboratory) if desired by the user. The invention has derived the SRG from, for example, an Atmospheric Profile Generator (APG). The APG is used to extract weather profiles from the AFWA MM5 weather data to perform line-of-sight atmospheric spectral transmittance calculations in the midwave infrared (MWIR) and longwave infrared (LWIR) using MODTRAN4. The SRG was augmented to perform at-sensor spectral radiance predictions of targets in the visible, near-infrared, and shortwave infrared (VIS/NIR/SWIR) for hyperspectral target detection.

For detection, standard spectral matching techniques, such as the matched filter, are applied followed by adaptive thresholding and confidence assignments (based on the frequency of detections from multiple libraries) to optimize probabilities of detection and minimize the false alarms.

One of the many advantages of the invention is its ability to predict the radiance signatures of target libraries under multiple illumination conditions. In addition to the amplitude reduction, the spectral shape of a target's radiance signature shifts towards the blue part of the spectrum when under full shade due to the dominance of the sky shine. Target spectra in partial shade are modeled as linear combinations of the full sun and full shade signatures. The result is an illumination invariant signature set of target radiance libraries, for a mission, that are plotted on the screen and saved on disk.

Thus, the invention predicts at-sensor and collection-specific target signatures by incorporating weather forecast data for the purposes of target detection. This approach allows for the detection of targets in both varying weather and illumination conditions. Conventional systems focus largely on in-scene detection techniques, such as anomaly detection, that do not require a database of target signatures. To identify anomalies, conventional systems project the at-sensor radiance datacube to the reflectance domain. This projection is performed either empirically or through the use of a model-based retrieval algorithm. The invention alleviates the need for further atmospheric compensation following the acquisition of the hyperspectral datacube.

The invention is also different than systems that use historical climatological parameters to produce literally thousands of signatures to simulate all possible atmospheric and illumination conditions and can be performed prior to a data collection. Such methods present a computational burden on the mission planner and on the target detection processor and thus are not optimal for the tactical environment. To the contrary, the invention incorporates timely and accurate current weather forecasts which results in a more meaningful and manageable signature database.

The radiance to reflectance form of atmospheric compensation is not feasible for tactical operational applications. First, the required pixel-by-pixel transformation of the datacube is computationally expensive. Second, artifacts near the atmospheric absorption bands are present in the resulting reflectance cube that are difficult to account for in near real-time. Finally, the conventional approach does not lend itself well to scenes with significant illumination variability. It is difficult, for example, to retrieve the true reflectance of a target that is heavily shadowed due to the low amplitude and spectral shift of the radiance signature. The inventive approach, conversely, forecasts the signature of targets under multiple illumination conditions from full sun to full shade prior to the image collection taking place.

Thus, as shown above, the invention performs atmospheric compensation during the mission-planning phase. More specifically, the invention selects spectral reflectance libraries from a target signatures database and projects them to the at-sensor and collection-specific radiance domain using current weather forecast data. This obviates the need to compensate the entire datacube and allows for platform-based target detection immediately following the acquisition of the datacube. In other words, with the invention, all of the atmospheric compensation takes place in the mission-planning phase of an operation, which allows features and targets to be easily identified through a quick comparison operation while the image data is being captured by the sensor. Therefore, the invention is vastly superior to conventional systems because it provides compensation and the capability for features/target identification in real time as the sensor captures data and produces a very low computational burden at the time of data acquisition (image sensing). Therefore, the invention is substantially more useful, easier to produce, and less-expensive then conventional systems.

The invention provides robust platform-based detection of targets, through the described methodology, that is invariant to whether the background is desert, forest, urban, or littoral. In other words, the invention is applicable to multiple environments. This invention, designed for VIS/NIR/SWIR sensors, could also be expanded to support long-wave infrared (LWIR) hyperspectral sensors that operate from 8 to 12 microns for both day and nighttime target detection. Instead of producing a suite of target signatures at multiple illumination conditions, target spectra at multiple surface temperatures could be created. The remainder of the processing chain, shown in FIG. 3, would be the same including the capability to incorporate timely weather data into the radiance libraries.

While the invention has been described in terms of preferred embodiments, those skilled in the art will recognize that the invention can be practiced with modification within the spirit and scope of the appended claims.

What is claimed is:

1. An automated method of adaptive threshold hyperspectral detection comprising:
    acquiring atmospheric forecast information;
    selecting at least one reflectance library;
    inputting said atmospheric forecast information, at least one selected reflectance library, and data collection and sensor parameters into a model to produce at least one mission radiance library;
    collecting hyperspectral data; and
    comparing said hyperspectral data to said mission radiance library to identify features;
    adapting threshold of hyperspectral data detection automatically.

2. The method in claim 1, wherein said atmospheric forecast information comprises a prediction of atmospheric conditions that will occur in the area where said collecting of said hyperspectral data is to be performed during the time period when said collecting of said hyperspectral data is to be performed.

3. The method in claim 1, wherein said mission radiance library comprises a prediction of what said sensor is expected to observe during said process of collecting said hyperspectral data if said features are present.

4. The method in claim 1, wherein said mission radiance library is specific to a mission being executed during said process of collecting said hyperspectral data.

5. The method in claim 1, wherein said processes of inputting said atmospheric forecast information, said selected reflectance library, and said data collection and sensor parameters into said model is performed during a mission planning phase.

6. The method in claim 1, wherein said reflectance library comprises historical reflectance measurements of said features.

7. The method in claim 1, wherein said process of collecting hyperspectral data comprises collecting aerial images of a planet surface.

8. An automated method of adaptive threshold hyperspectral detection comprising:
    acquiring atmospheric forecast information based on current real time atmospheric measurements;
    selecting at least one surface reflectance library, wherein said surface reflectance library is based on surface reflectance measurements;
    acquiring data collection and sensor parameters;
    inputting said atmospheric forecast information, at least one selected surface reflectance library and said data collection and sensor parameters into a model to produce at least one mission radiance library;
    collecting hyperspectral data;
    comparing said hyperspectral data to said mission radiance library to identify targets; adapting threshold of hyperspectral data detection automatically.

9. The method in claim 8, wherein said atmospheric forecast information comprises a prediction of atmospheric conditions that will occur in the area where said collecting of said hyperspectral data is to be performed during the time period when said collecting of said hyperspectral data is to be performed.

10. The method in claim 8, wherein said mission radiance libraries comprise a prediction of what said sensor is expected to observe during said process of collecting said hyperspectral data if said targets are present.

11. The method in claim 8, wherein said mission radiance library is specific to a mission being executed during said process of collecting said hyperspectral data.

12. The method in claim 8, wherein said processes of inputting said atmospheric forecast information, said selected reflectance library, and said data collection and sensor parameters into said model is performed during a mission planning phase.

13. The method in claim 8, wherein said reflectance library comprises historical reflectance measurements of said targets.

14. The method in claim 8, wherein said process of collecting hyperspectral data comprises collecting aerial images of a planet surface.

15. An automated system for performing adaptive threshold hyperspectral detection comprising:

a hyperspectral detection processing unit connected to at least one atmospheric forecast database and at least one reflectance library database;

a sensor connected to said hyperspectral detection processing unit; and a comparator connected to said hyperspectral detection processing unit, wherein said hyperspectral detection processing unit is adapted to:

input atmospheric forecast information from said atmospheric forecast database, at least one selected reflectance library from said reflectance library database, and data collection and sensor parameters relating to said sensor;

process a model to produce at least one mission radiance library; and automatically assign optimal threshold for detection processing;

wherein said sensor is adapted to collect hyperspectral data, and wherein said comparator is adapted to compare said hyperspectral data to said mission radiance library to identify features.

16. The system in claim 15, wherein said atmospheric forecast information comprises a prediction of atmospheric conditions that will occur in the area where said collecting of said hyperspectral data is to be performed during the time period when said collecting of said hyperspectral data is to be performed.

17. The system in claim 15, wherein said mission radiance library comprises a prediction of what said sensor is expected to observe during said process of collecting said hyperspectral data if said features are present.

18. The system in claim 15, wherein said mission radiance library is specific to a mission being executed during the collecting of said hyperspectral data.

19. The system in claim 15, wherein the inputting of said atmospheric forecast information, said selected reflectance library, and said data collection and sensor parameters into said model is performed during a mission planning phase.

20. The system in claim 15, wherein said reflectance library comprises historical reflectance measurements of said features.

* * * * *